Feb. 20, 1973   N. E. DOYLE, JR   3,717,565
ION-RESPONSIVE ELECTRODE CONSTRUCTION
Filed Aug. 19, 1970
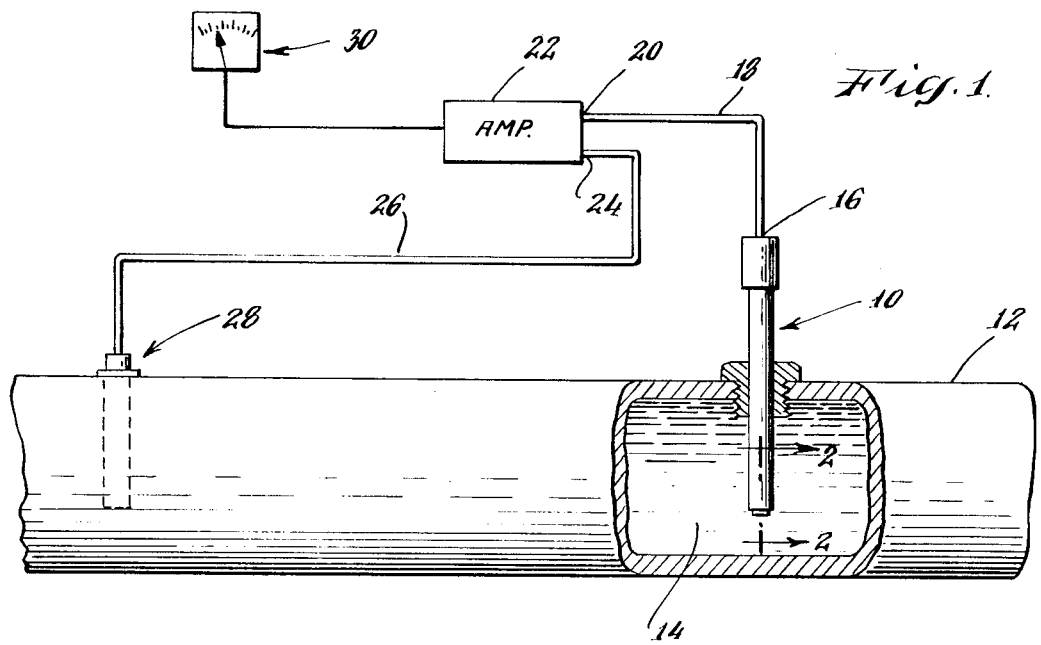
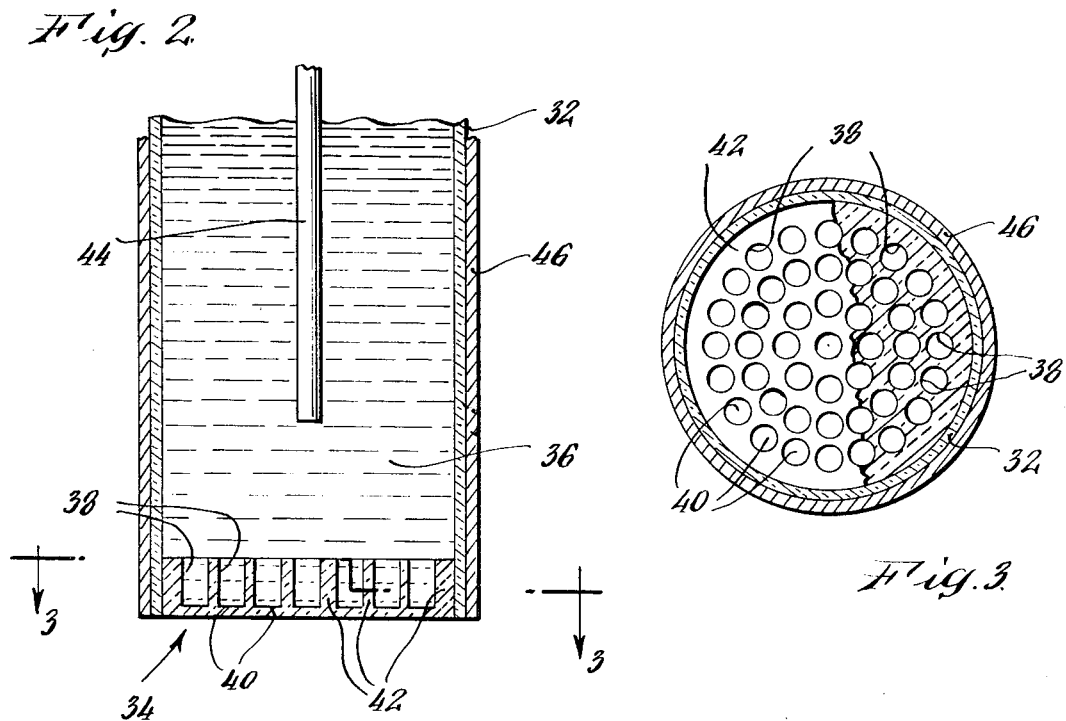
INVENTOR.
Nicholas E. Doyle, Jr.
BY
Bryan, Parmelee, Johnson & Bollinger
ATTORNEYS.

United States Patent Office 3,717,565
Patented Feb. 20, 1973

3,717,565
ION-RESPONSIVE ELECTRODE CONSTRUCTION
Nicholas E. Doyle, Jr., Norwood, Mass., assignor to The Foxboro Company, Foxboro, Mass.
Filed Aug. 19, 1970, Ser. No. 65,083
Int. Cl. G01n 27/36
U.S. Cl. 204—195 G    5 Claims

ABSTRACT OF THE DISCLOSURE

An ion-sensing electrode including a fragile ion-sensitive membrane supported by a reinforcing structure in the form of a honeycomb to provide for the membrane mechanical strength and resistance to damage. The reinforcing structure and membrane can be formed as a single homogeneous unit by molding from ion-sensitive glass, and/or by machining techniques.

This invention relates to ion-sensitive electrodes for measuring ionic activity or concentration. More particularly, this invention relates to an electrode construction having substantial mechanical strength and ruggedness to facilitate use directly in industrial processes.

Measurements of ionic activity (or concentration) have long been made by inserting into the test liquid a pair of electrodes at least one of which may be provided with a fragile membrane selectively responsive to the particular ion of interest. One common type of such measurement is that of hydrogen ion activity (pH), conventionally made by a pair of electrodes referred to respectively as a glass electrode and a reference electrode. Such electrodes develop an E.M.F. (potential) which is a function of hydrogen ion activity. This potential is directed to an amplifier the output of which may drive an indicating or controlling device.

A glass electrode generally comprises a cylindrical tubular element of glass closed off at one end by a thin bulbous glass membrane formed of a special composition sensitive to hydrogen (or other) ions. The outer surface of this membrane is immersed in the test liquid, to make electrical contact therewith. Within the tubular element is an electrically-conductive buffer liquid (electrolyte) which wets the inner surface of the glass membrane to establish electrical continuity with properly controlled differential potentials.

Immersed in the electrolyte is a circuit-completing internal element formed for example of silver, silver chloride and connected to an output lead extending to one input terminal of an amplifier. The other amplifier input terminal is connected to the reference electrode. These two electrodes form, together with the test liquid, an electro-chemical cell which generates an E.M.F. proportional to hydrogen ion activity. The individual glass or reference electrodes thus are at times referred to as "half cells." Detailed information on such known arrangements may be found in the book "Determination of pH, Theory and Practice," by Roger G. Bates (John Wiley and Sons, New York, 1964); see particularly Chapter 11.

The accuracy of measurement with a glass electrode system is dependent in part upon its overall effective internal resistance, primarily the resistance of the membrane. As in any voltage generating arrangement, the higher the internal resistance, the greater will be the difference between the voltage measured at the output terminals and the actual internally generated voltage, because of the voltage drop across the internal resistance resulting from the flow of current to the voltage measuring device. (Although there would be no internal voltage drop if the measuring device did not draw any current, as a practical matter the measurement requires some current flow, even though very tiny when measuring devices with extremely high input impedance are used.)

Accordingly, the effective internal resistance of a glass electrode should be made as low as possible. Since glass has a very high bulk resistivity, the glass membrane must be quite thin, in order to assure a sufficiently low internal resistance for accurate measurements. Even with such thin membranes, the internal resistance typically is so high that quite sophisticated electronic techniques are required to make reasonably accurate measurements of the potential developed.

Although conventional glass electrodes have been used successfully for many years in making laboratory measurements and the like, there have been problems in employing such electrodes widely in industrial process instrumentation applications. One important reason for this is that the glass electrode membrane, because it is so thin, is relatively delicate and thus cannot withstand the kinds of mechanical shock and other abuse which instruments typically receive in an industrial process environment. It is not possible simply to make the glass membrane more rugged merely by increasing its thickness, for a thick membrane would present too high an electrical resistance for accurate measurement of the electric potentials developed. Various attempts have been made to solve this problem by providing special protective means for the electrode, and by developing a ruggedized electrode, but none of the solutions has been entirely satisfactory.

Accordingly, a principal object of this invention is to provide an ion-sensitive electrode construction which is mechanically rugged. A more specific object of the invention is to provide a ruggedized glass electrode suited for industrial process applications. Still another object of the invention is to provide a reliable and durable electrode construction permitting the use of relatively thin membranes. Other objects, aspects and advantages of the invention will in part be pointed out in, and in part apparent from, the following description considered together with the accompanying drawings, in which:

FIG. 1 is an elevation view, partly in section, showing a glass electrode embodying the present invention;

FIG. 2 is an enlarged detail section taken along 2—2 of FIG. 1; and

FIG. 3 is a horizontal section taken along line 3—3 of FIG. 2.

Referring now to FIG. 1, there is shown a glass electrode 10 inserted in a pipe 12 to contact a stream of flowing liquid 14 the hydrogen ion activity of which is to be measured. The electrode may in practice be mounted in a flange of the pipe, but such details have been omitted for the sake of simplicity. The output terminal 16 of the electrode is connected in the usual fashion through a cable 18 to one input terminal 20 of an amplifier 22. The other input terminal 24 of this amplifier is connected by a lead 26 to a conventional reference electrode such as a silver, silver chloride cell 28 inserted into the flowing liquid 14 at a point spaced from the electrode 10. The output of the amplifier drives an indicator or the like, illustrated at 30.

Referring also to FIGS. 2 and 3, the electrode 10 comprises an elongate glass tube 32 closed off at its lower end by a relatively thick disc-shaped member or element 34. The tube thus forms a container or vessel adapted to hold a quantity of the usual electrolyte liquid 36. Member 34 is a homogeneous unit made entirely of ion-sensitive glass, formed in a honeycomb configuration with a plurality of vertical adjacent holes 38 of relatively large diameter and extending from the upper surface down towards the lower surface of the member.

The holes 38 extend very nearly through the member 34, so that at the bottom of each hole 38 there is a circular section 40 of very thin glass. The electrolyte 36 fills the holes and makes contact with the inner surface of the circular sections 40. The remote (outer) surfaces of these sections are exposed to the test solution 14. Each circular section is sufficiently thin to serve as an ion-sensitive membrane, so as to develop an E.M.F. proportional to ion activity in the test solution. All of the sections act in concert to produce such an E.M.F., and therefore the set of such sections will be referred to in the singular simply as a membrane.

The disc-shaped honeycomb member 34, although in fact a single homogeneous unit, can be viewed as the combination of a thin ion-sensitive membrane (represented by the entire set of thin glass sections 40) integral with and physically supported by a reinforcing structure consisting of a large mass 42 of material (all the remainder of the block-like structure except for the membrane 40). This mass of material is formed with holes (passages) 38 through which liquid can pass to reach one surface of the membrane so as to establish electrical contact therewith, the remote surface of the membrane being arranged to contact the other liquid, thereby to generate the desired E.M.F. proportional to ionic activity. The electrical circuit is completed through an internal reference element 44 immersed in the electrolyte 36 and connected through electrode terminal 16 to the cable 18.

The supporting mass of material 42 is considerably thicker than the membrane 40; for example, the vertical thickness of the glass block may be ten to one hundred times the thickness of the membrane. This mass of material has substantial mechanical strength, with a high resistance to damage from physical abuse, and particularly affording protection from thermal shock. Thus the mass of material 42 can provide a desirably high degree of structural reinforcement and protection for the thin membrane, permitting the electrode to be used successfully in environments which would be considered injurious to, and thus unacceptable for, electrodes of the usual fragile construction.

The glass honeycomb member 34 may advantageously be formed by molding. That is, glass of known ion-sensitive composition, heated to above its softening temperature, may be poured or otherwise deposited in suitably designed glass-casting molds and allowed to cool. In many conventional glass molding operations it is difficult to hold close dimensional tolerances, and thus it may be preferred to mold the structure initially with a relatively thick membrane 40, and thereafter finish the molded glass by conventional machining operations to obtain a suitably thin membrane.

Alternatively, the honeycomb member 34 may be formed by drilling holes 38 in an initially solid mass of ion-sensitive glass. This operation can for example be carried out by an ultrasonic drill having multiple drill elements which function simultaneously in parallel fashion. One such drill is known commercially by the name "Cavitron."

The completed member 34 is fused to the walls of the glass tube 32, to provide a liquid-tight seal therebetween. This fusion may be accomplished in known fashion, as by a torch, or other known techniques.

The coefficient of thermal expansion of the glass tube 32 should be substantially the same as that of the ion-selective glass member 34, e.g. within one or two percent, to insure maintenance of a good mechanical joint and seal in the face of changes in ambient temperature. The electrode may include an outer metal case 46 to provide additional mechanical strength. Electrostatic shielding may also be provided where appropriate.

The electrolyte 36 may be a buffered solution of fixed hydrogen-ion and chloride-ion concentration saturated with AgCl, in the case of a pH electrode, or a solution of NaCl saturated with AgCl in the case of a sodium-ion-sensitive glass electrode. The buffered solution fills up the holes 38 so as to contact the adjacent surface of the ion-sensitive glass membrane 40. The remote side of this membrane is in contact with the flowing test solution 14, and accordingly the membrane develops a potential between its surfaces responsive to the activity or concentration in the test solution of the ions of interest. This potential is measured using well-known techniques.

It will be apparent to one skilled in the art that various modifications may be made in the construction of the disclosed electrode without departing from the spirit or scope of the invention. For example, the holes 38 may be of various sizes or shapes, within any range which combines adequate structural strength with the ability to transmit liquid to the membrane surfaces. The essential elements of the invention are intended to be set forth in the accompanying claims.

What is claimed is:

1. In an electrode to be inserted in a test solution to measure the activity or concentration of a predetermined ion in said test solution, said electrode including a container holding an electrolyte solution and having at one wall portion thereof a thin ion-sensitive membrane exposed at its inner surface to said electrolyte and arranged to be exposed at its outer surface to the test solution for the purpose of developing an electrical potential responsive to the activity or concentration of the predetermined ion; that improvement in the foregoing class of electrode wherein:
   said one wall portion comprises a homogeneous, integral mass of material having a relatively substantial wall thickness so as to provide high mechanical strength;
   said material being characterized by sensitivity to said ion to be measured appropriate for use as an ion-sensing membrane;
   said mass of material presenting an inner surface arranged to contact said electrolyte and an outer surface arranged to contact said test solution;
   an interior portion of said mass of material being formed with a plurality of holes extending from openings at said inner surface and terminating in blind ends a short distance from said outer surface;
   the regions between said ends of said holes and said outer surface being sufficiently thin so as to provide ion-sensitive membrane characteristics in developing said electrical potential;
   said holes serving to conduct the electrolyte solution through said mass of material to the inner surface of said membrane regions and the portions of said homogeneous mass of material surrounding said holes providing reinforcing structural support for said membrane regions.

2. An electrode as in claim 1, wherein said container comprises a glass tube, said mass of material comprising ion-sensitive glass fused to one end of said glass tube.

3. An electrode as in claim 2, wherein said outer surface is flat.

4. An electrode as in claim 3, wherein said mass of material is cylindrical in shape; and
   an outer isolation member secured in place surrounding the sides of said cylindrical mass of material at least at the lower end thereof which is adjacent said membrane regions.

5. An electrode as in claim 1, wherein said mass of material is formed in a honeycomb-like configuration with straight parallel holes.

References Cited

UNITED STATES PATENTS

| | | | |
|---|---|---|---|
| 2,117,596 | 5/1938 | Bender et al. | 204—195 |
| 3,070,540 | 12/1962 | James et al. | 204—195 |
| 3,458,422 | 7/1969 | Proctor | 204—195 |

FOREIGN PATENTS

| | | | |
|---|---|---|---|
| 50,352 | 5/1941 | Netherlands | 204—195 G |
| 495,303 | 11/1938 | Great Britain | 204—195 |

GERALD L. KAPLAN, Primary Examiner

U.S. Cl. X.R.

204—195 M